C. A. WAKEFIELD.
Hand Seeder.
No. 11,395.
Patented July 25, 1854.
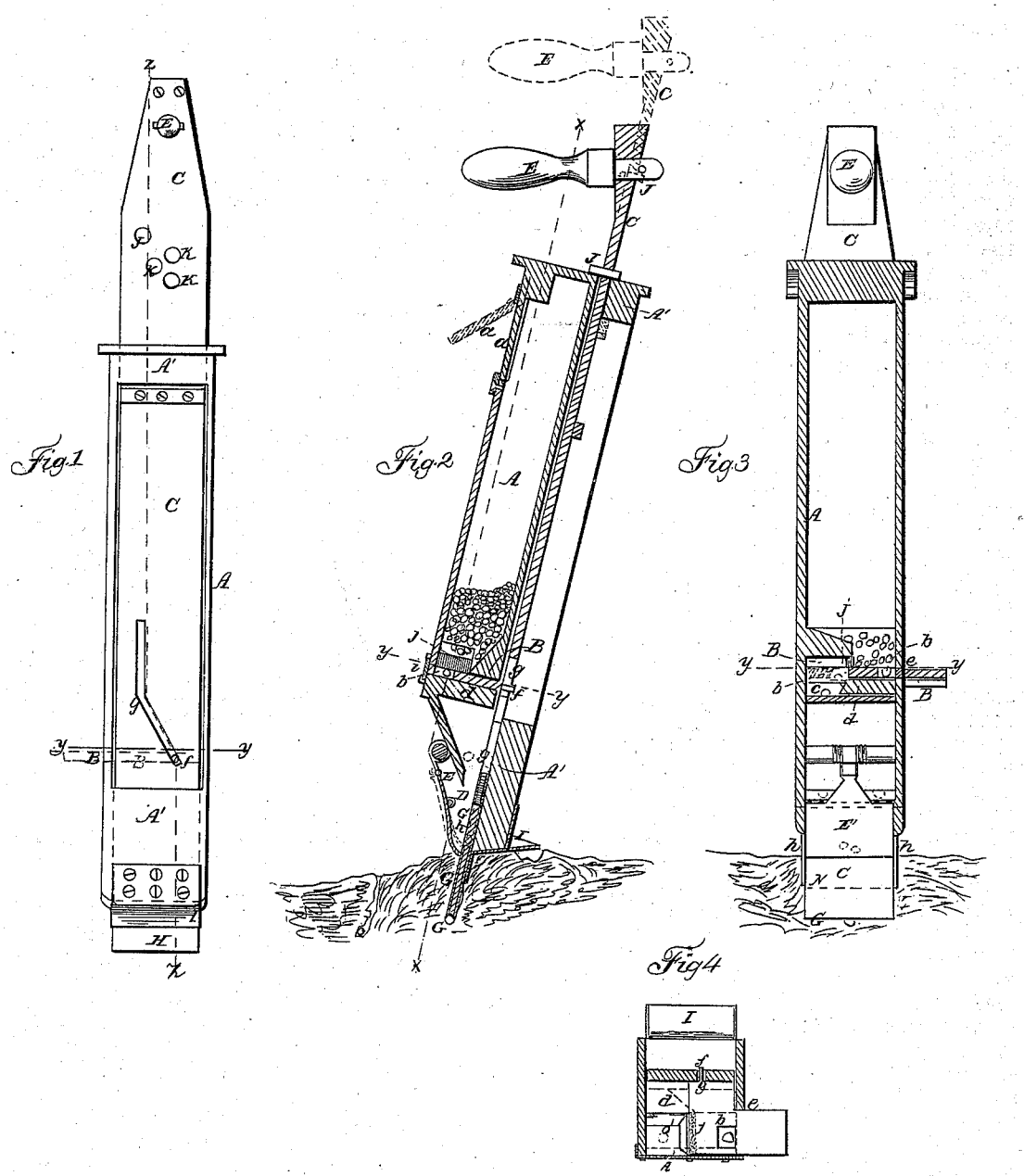

UNITED STATES PATENT OFFICE.

CHARLES A. WAKEFIELD, OF PLAINFIELD, MASSACHUSETTS.

IMPROVEMENT IN SEED-PLANTERS.

Specification forming part of Letters Patent No. 11,395, dated July 25, 1854.

*To all whom it may concern:*

Be it known that I, CHARLES A. WAKEFIELD, of Plainfield, in the county of Hampshire and State of Massachusetts, have invented a new and useful Improvement in Hand Corn-Planters; and I do hereby declare that the following is a full, clear, and exact description of the same, reference being had to the accompanying drawings, forming part of this specification, in which—

Figure 1 is a front elevation or external view of the corn-planter, the plunger or vertical valve being in. Fig. 2 is a vertical section of the planter through the line $zz$ in Fig. 1, the plunger or vertical valve being out. Fig. 3 is a vertical section of the machine through the line $xx$ in Fig. 2, the plunger being out. Fig. 4 is a horizontal section through the line $yy$ in Figs. 1, 2, and 3.

Similar letters of reference in each of the several figures indicate corresponding parts.

In the "hand-planter" represented in the accompanying drawings, the corn is contained in a box or hopper, A, being fed therein through a lid, $a$, near the top. A guide-frame, A', is arranged on front of the seed-box A to direct the up-and-down movement of an embedding-plunger, C, which, in its double movement, by means of a groove, $g$, and pin $f$, alternately opens and closes a delivery-slide, B, that works in a groove, $e$, in the seed-box at or near its bottom, and that has a seed-aperture, $b$, in it, that as the plunger C ascends conveys a suitable quantity of corn to be planted in a single hill over an aperture, $c$, in the corner of the bottom of the hopper, through which the corn, thus conveyed by the delivery-slide, drops into a receiving-chamber, D, beneath. In the descent of the plunger C, when planting, the delivery-slide B is drawn back to take in a fresh supply of corn from the hopper and hold it ready for another delivery, while the plunger C in its continued descent ejects the corn previously fed by the delivery-slide into the receiving-chamber through the bottom of the said receiving-chamber D, and embeds it to the proper depth in the ground, the plunger C opening the receiving-chamber by its pressure against the back plate thereof, which is made elastic or acted upon by a spring to admit of the corn being forced out of the receiving-chamber by the plunger passing therethrough, and to insure the receiving-chamber closing again when the plunger is drawn upward to hold the corn fed into it by the delivery-slide B. A lip or flange, G, projects from the plunger C at its bottom end on the rear side to hold and guide the corn when being embedded in between it and a short front plate, H, which enters the ground and projects from a broad front stop-plate, I, that bears down or rests upon the surface of the ground, as represented in Fig. 2, and prevent the machine entering the ground with the plunger C. Side flanges, $h\ h$, also project from the front stop-plate, I, and serve, in conjunction with the elastic back-plate of the receiving-chamber D and bottom projecting plate, H, to scrape off the dirt adhering to the sides and edges of the plunger C on the plunger being drawn out of the ground into the receiving-chamber D. Any suitable device may be employed for gaging the stroke of the plunger to vary its depth of entry into the soil, as circumstances require.

The plunger C is provided at its top, on the rear side or face of it, with a handle, E, by which the operator holds or carries the machine and operates the plunger. This handle E projects obliquely from the plunger in such a manner that when the said handle occupies a horizontal position the plunger is situated at a considerable inclination from the perpendicular, pointing backward downwardly; or the handle E may be otherwise equivalently arranged or set so that the same oblique direction will be given with certainty to the plunger in holding and operating it by the handle without any special effort on the part of the hand to give the plunger its specified oblique action or direction, and by the simple effort of bearing down or up on the handle necessary to give the plunger its reciprocating action, by which arrangement the embedding-plunger C is caused invariably to enter and leave the ground during all and every of its several operations in the same obliquity of direction automatically, as it were, or, in other words, without its requiring any special adjustment by the hand of the operator, and whereby he is enabled to operate the planter with greater facility and expedition, as clutching firmly the handle E of the plunger with his right hand, he, stepping from hill to hill, strikes the machine, as a man would a walking stick or cane, obliquely at his side against the ground slightly behind him, causing the short front plate, H, to enter the ground and the stop-plate I to take its bearing on the earth, also the plunger C to eject the corn through the bottom of the receiving-chamber D, and carry or force it (the corn) to its required depth obliquely into the earth, after which the plunger C is raised or drawn in the same oblique direction out of the earth, the stop-plate I acting as a fulcrum during the lateral strain upon the plunger by the position of the handle in drawing out the plunger, which, in starting the plunger out of the earth, causes the earth slightly to yield under the stop-plate I, and the bottom end of the plunger on the rear side to be turned slightly up, so as to loosen the earth on the overhanging side of the oblique recess in the earth formed by the plunger, whereby the falling of the earth over the seed, in drawing out the plunger, is insured, though the narrowness and obliquity of the recess formed by the plunger would of themselves almost effectually prevent all possibility of the earth failing to cover the seed, especially as in drawing out the plunger C the springing side of the receiving-chamber D, projecting plate H, and side flanges, h, act as scrapers throughout the entire withdrawal of the plunger from the embedded seed, till its arrival at the top of the recess to detach and drop back into the recess over the seed all soil adhering to the plunger. These are points of great importance in the operation of my planter, and make its action greatly superior to the planter of Samuel Malone patented on the 3d of January, 1854, and other machines of a like character, in which the elastic or opening and closing receiving-chamber D is forced perpendicularly into the ground to form the recess, and is opened with great difficulty when in the ground to deposit the seed, the said receiving-chamber or depositing-tube, when thus operated, carrying up the adhering earth with it out of the ground, instead of dropping it behind to cover the seed, and the said receiving-chamber by opening when in the ground becoming clogged with dirt at its opening sides, so as materially to affect the operation of the machine, and the said receiving-chamber leaving, when withdrawn from the ground, a wide recess having no overhanging side, so that the earth frequently fails to cover the seed; nor in any such machines does the same facility exist for planting expeditiously as with mine, as distinct motions or actions have usually been requisite to insert the depositing-tube and drop or embed the seed, while the perpendicular action of such machines is less in accordance with the movement forward of the operator than the specified oblique action or cane motion of mine, which, as specified, involves no delay in directing it into or out of the ground, but is self-adjusting as regards direction, insuring the same obliquity of action both on entering and leaving the ground, and this set obliquity or angle, "naturally" as it were, assumed by the plunger is such that apart from the specified loosening of the earth by the plunger and the scraping of the adhering soil from the plunger, the certainty of the earth falling in to cover the seed in soils of ordinary stiffness is effected by the overhanging position of the one side of the recess.

I do not claim as new in hand seed-planters the mere use or arrangement of a seed hopper or box, delivery-slide, and elastic or opening and closing receiving-chamber with ejecting-plunger operating therein or through, as such arrangements, I am aware, have before been used; but in such arrangements the receiving-chamber has formed a depositing-tube entering the ground with the plunger, and served to form the hole or recess in the earth for reception of the seed; but I do claim as new and useful and desire to secure by Letters Patent so arranging and operating the plunger C, in connection with the receiving tube or chamber D and its delivery-slide B, or the equivalent thereof, that the plunger C, ejecting the corn deposited in the receiving-chamber, is made to embed the corn from the surface of the earth to its required depth obliquely into the ground, while the receiving tube or chamber D, resting by a front stop-plate, I, on or above the ground, is made to open and close clear of all surrounding dirt, and the sides of the said chamber D made to act as scrapers above the recess to clear the plunger of adhering soil, and cover the seed therewith throughout the entire withdrawal of the plunger, substantially as specified, whereby the receiving tube or chamber D is prevented clogging with dirt at its opening sides, the width of the opening made in the earth for the reception of the seed is diminished, and the corn covered with more certainty, as herein set forth.

Nor do I claim of itself as new planting obliquely; but I do further claim the method herein described of operating the planter by the hand at the side, in such a manner that the same force or pressure applied to working the plunger up and down gives to the planter automatically, as it were, one and the same obliquity of stroke in a backwardly direction downward, or in a forwardly direction upward throughout its several operations, both on entering and leaving the ground, by means of the obliquely-set handle E on the rear side of the plunger, or other equivalent arrangement of the handle producing the same action, substantially as specified, and whereby the planter may be used with greater facility and expedition, and the recess formed for the planting of the corn be made with certainty of the necessary obliquity without involving any delay in adjusting the direction or movement of the plunger to insure the earth on the overhanging side of the said recess falling in to cover the corn, as herein set forth.

CHAS. A. WAKEFIELD.

Witnesses:
GEO. VINING,
SUSAN VINING.